Oct. 15, 1957    F. C. WILLIAMS ET AL    2,810,092
ELECTRICAL APPARATUS FOR INFORMATION STORAGE
Original Filed Oct. 31, 1949    11 Sheets-Sheet 1

INVENTOR
FREDERIC C. WILLIAMS
TOM KILBURN
BY
Stevens, Davis, Miller & Mosher
ATTORNEY.

Oct. 15, 1957    F. C. WILLIAMS ET AL    2,810,092
ELECTRICAL APPARATUS FOR INFORMATION STORAGE
Original Filed Oct. 31, 1949                     11 Sheets-Sheet 2
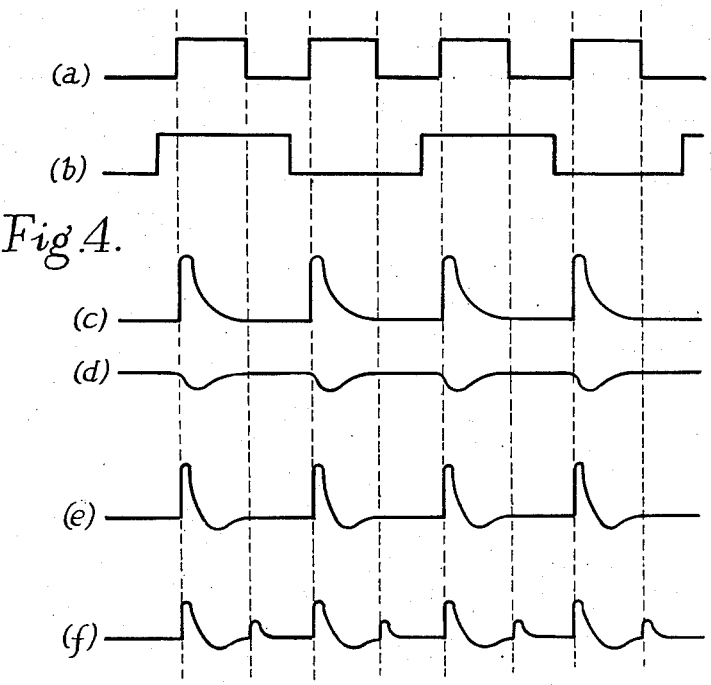
Fig. 4.
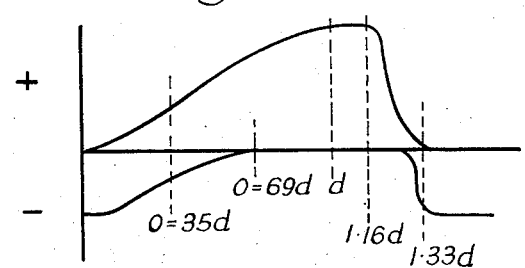
Fig. 5.
Fig. 6.
INVENTOR
FREDERIC C. WILLIAMS
TOM KILBURN
BY
Stevens, Davis, Miller & Mosher
ATTORNEYS Oct. 15, 1957   F. C. WILLIAMS ET AL   2,810,092
ELECTRICAL APPARATUS FOR INFORMATION STORAGE
Original Filed Oct. 31, 1949   11 Sheets-Sheet 3
Fig. 7
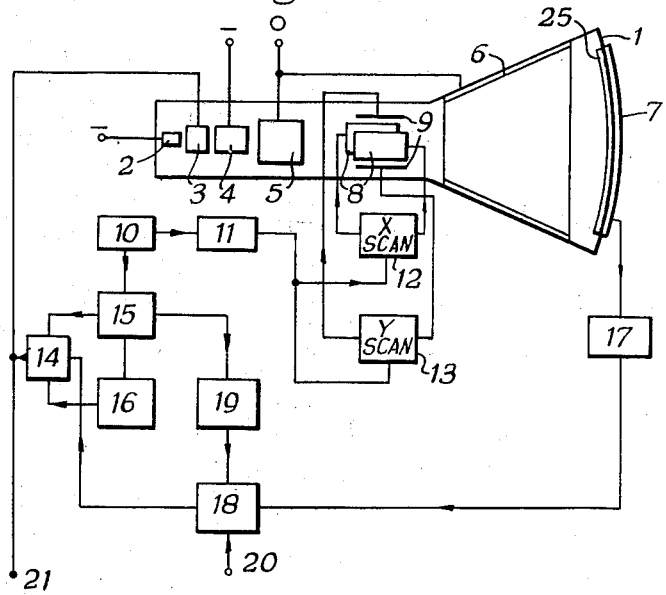
Fig. 10.
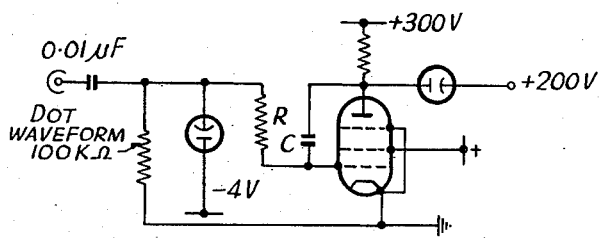
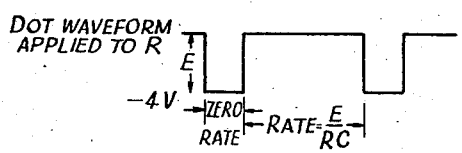
GENERATION OF TIME BASE WITH PAUSE DURING DOT PERIOD
INVENTOR
FREDERIC C. WILLIAMS
TOM KILBURN
BY
Stevens, Davis, Miller + Mosher
ATTORNEYS

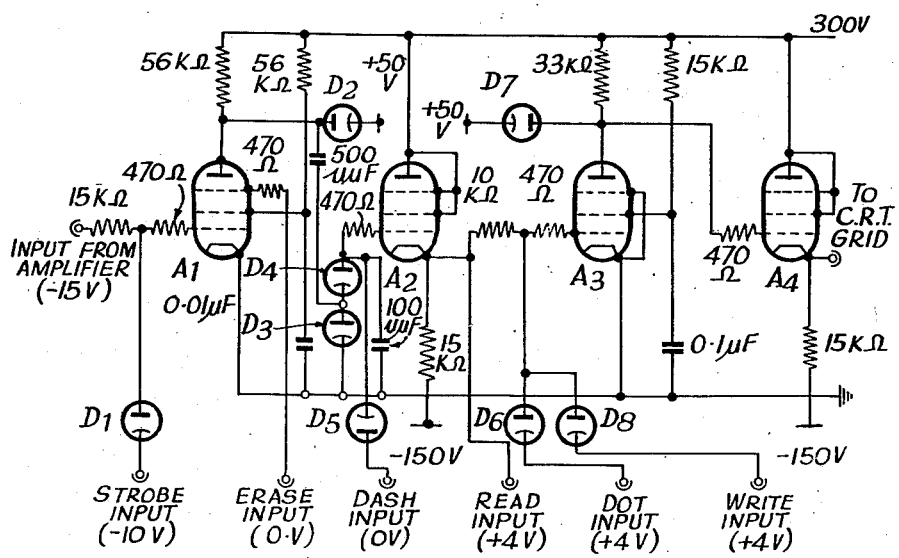
Fig. 9.
THE GATE CIRCUIT
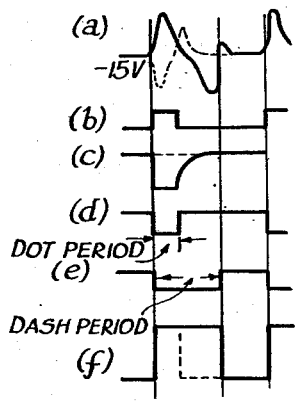
Fig. 9a-f
WAVEFORMS APPROPRIATE TO GATE CIRCUIT
(a) AMPLIFIER OUTPUT   (d) DOT WAVEFORM
(b) STROBE             (e) DASH WAVEFORM
(c) A1 ANODE           (f) OUTPUT TO GRID
INVENTOR
FREDERIC C. WILLIAMS
TOM KILBURN
BY
Stevens, Davis, Miller + Mosher
ATTORNEYS

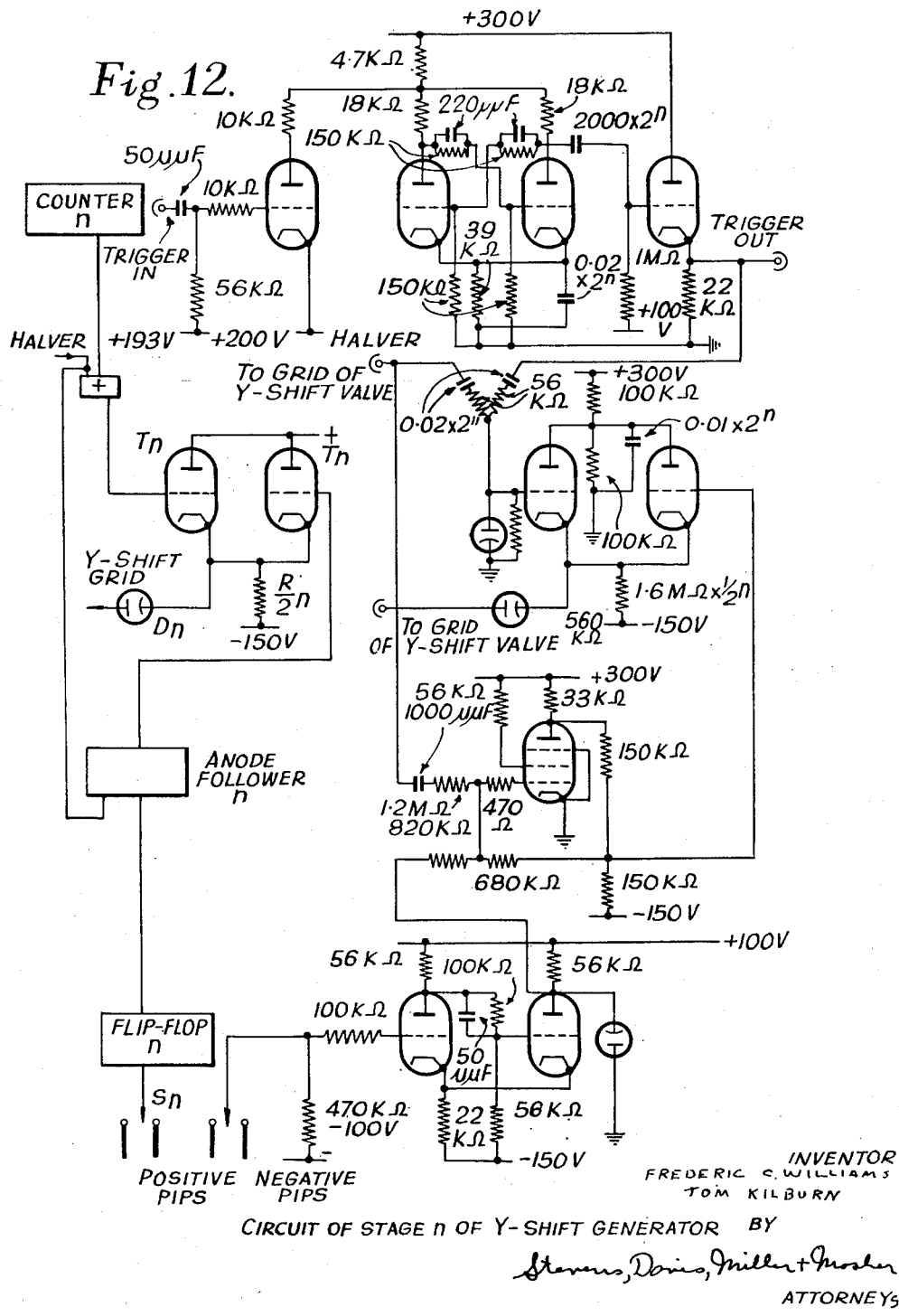

Oct. 15, 1957 — F. C. WILLIAMS ET AL — 2,810,092
ELECTRICAL APPARATUS FOR INFORMATION STORAGE
Original Filed Oct. 31, 1949 — 11 Sheets-Sheet 9
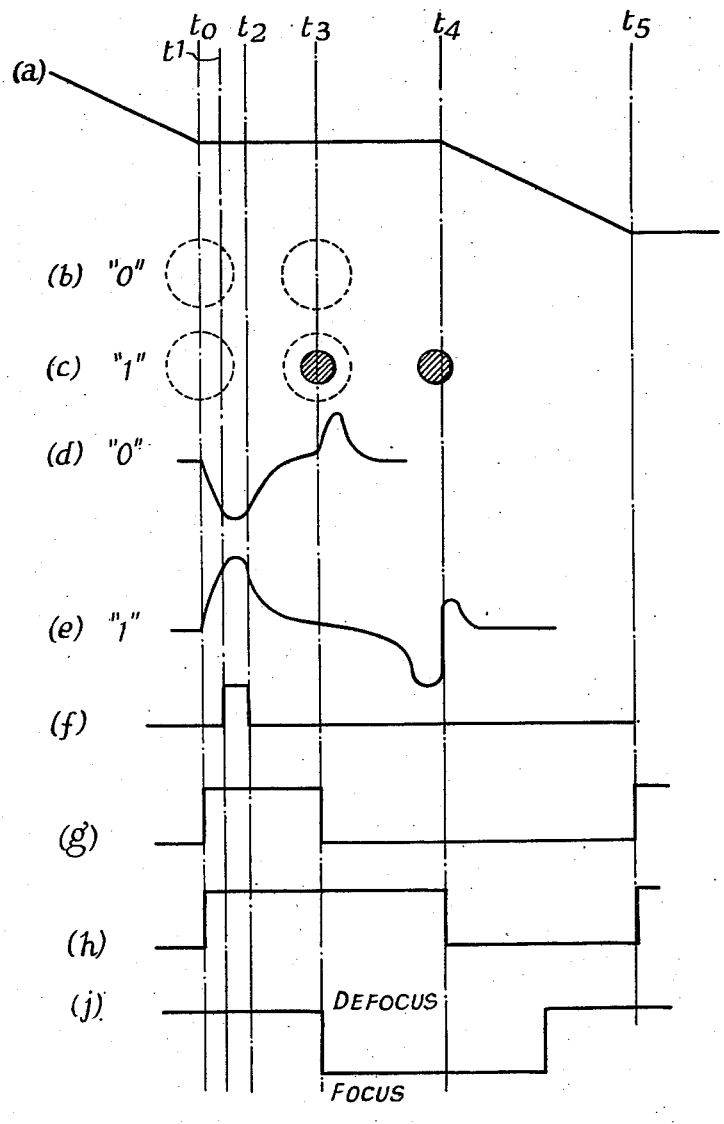

Oct. 15, 1957     F. C. WILLIAMS ET AL     2,810,092
ELECTRICAL APPARATUS FOR INFORMATION STORAGE
Original Filed Oct. 31, 1949     11 Sheets-Sheet 11

Fig. 17.

Fig. 18.
X DEFLECTION
Y DEFLECTION
FIRST INTERVAL DARK — BRIGHT — OPTIONAL 2ND INTERVAL
GRID OR INTENSITY ELECTRODE

Fig. 19.
SWEEPING SPOT    FOCUSSED SPOT
ILLUMINATION
1ST PERIOD ONLY - DOT    2ND PERIOD DASH

INVENTOR
FREDERIC C. WILLIAMS
TOM KILBURN
BY
ATTORNEYS

United States Patent Office 2,810,092
Patented Oct. 15, 1957

2,810,092

ELECTRICAL APPARATUS FOR INFORMATION STORAGE

Frederic Calland Williams, Romily, and Tom Kilburn, Manchester, England, assignors, by mesne assignments, to International Business Machines Corporation, New York, N. Y., a corporation of New York Continuation of application Serial No. 124,577, October 31, 1949. This application August 4, 1954, Serial No. 447,866

Claims priority, application Great Britain October 2, 1947

9 Claims. (Cl. 315—12)

This application is a continuation in part of copending application Serial No. 50,136 filed September 20, 1948, and a continuation of co-pending application Serial No. 124,577 filed October 31, 1949, now abandoned.

The present invention relates to electrical storage apparatus in which data in an electrical form are converted into a charge pattern on an insulating surface, the original electrical signals being reconstituted in a reading operation which involves exploring the charge pattern by a process similar to that by which the record was made.

It is a common requirement that it should be possible to read the stored information without erasing it, and one object of the present invention is to provide improved apparatus providing this facility.

Another object of the invention is concerned with the fact that no insulating surface will, in fact, hold a charge pattern indefinitely. In practice, leakage of charge over the surface has limited the storage time to a maximum of a few hours. It has been proposed, in the specification of U. S. patent application Serial No. 790,879 filed December 10, 1947, to avoid this limitation by periodically regenerating the charge pattern at intervals short compared with the maximum storage time, and this invention aims to provide improved recording and regenerating means which are of wide application, and are simple and reliable in operation.

The invention is of particular (but not exclusive) application to storage in digital computers and like machines. In a binary computer, for example, the digits 0 and 1 are readily represented by different electrical signals, and all numbers, operations, routing instructions and so on can be represented by groups of signals made up from the two elementary ones. The present invention accordingly aims to provide improved means for recording, reading and regenerating groups of signals in binary and other computers, and like machines.

According to the present invention, an electrical information storing system is provided comprising an insulating, recording surface contained in an evacuated envelope with means for producing an electron beam at a velocity such that, when the beam strikes the surface, the number of secondary electrons liberated is greater than the number of primary electrons arriving, means for causing the beam to irradiate repetitively a discrete area of said surface so as to cause said area to assume a state of charge significant of one element of information, modulating means adapted when operated to enable said beam to irradiate also a part of said surface adjacent said discrete area so as to modify the state of charge of said discrete area to render it significant of a different element of information, signal pick-up means associated with said surface, means for extracting from said signal pick-up means signals arising thereon at subsequent irradiations of said discrete area, and means for causing said signals to determine the operation of said modulating means in dependence on the state of charge due to the previous irradiation.

The invention is based on a discovery which is discussed in detail below, but which can be shortly summarised here in the following terms. In suitable circumstances, the charge distribution left behind it on an insulating surface by a cathode ray beam which impinges transiently on one discrete elementary area of the screen is dependent on whether the beam is also permitted to impinge subsequently on adjacent elementary areas: that is to say, the charge distribution due to irradiating one discrete elementary area may be modified by allowing the beam to proceed to irradiate an adjacent elementary area. The nature of any part of a charge pattern formed on an insulating surface by an irradiating cathode ray beam can, as is well known, be ascertained by reconverting the pattern into electrical signals by re-exploring the surface with the beam. This is the process of reading the charge pattern.

It will, of course, be evident that since the process of regeneration involves the production of signals corresponding to the charge pattern, it is also in fact a reading process; in general, however, it is convenient to arrange to regenerate the whole of a charge pattern in a cyclic way, whilst making provision for the reading of any specific part of the pattern as it may become necessary. The above refers to both the "dot-dash" and "defocus-focus" methods.

In the following description reference will be made to the drawings in which like numerals refer to like parts throughout.

Figs. 1–6 are explanatory diagrams illustrating the theory on which this invention is based with particular reference to "dot-dash."

Fig. 7 is a block schematic diagram of one form which the apparatus according to the invention may take.

Fig. 9 is a diagram showing in detail one form of gate circuit which may be used in block 18 of Fig. 7.

Figure 15:
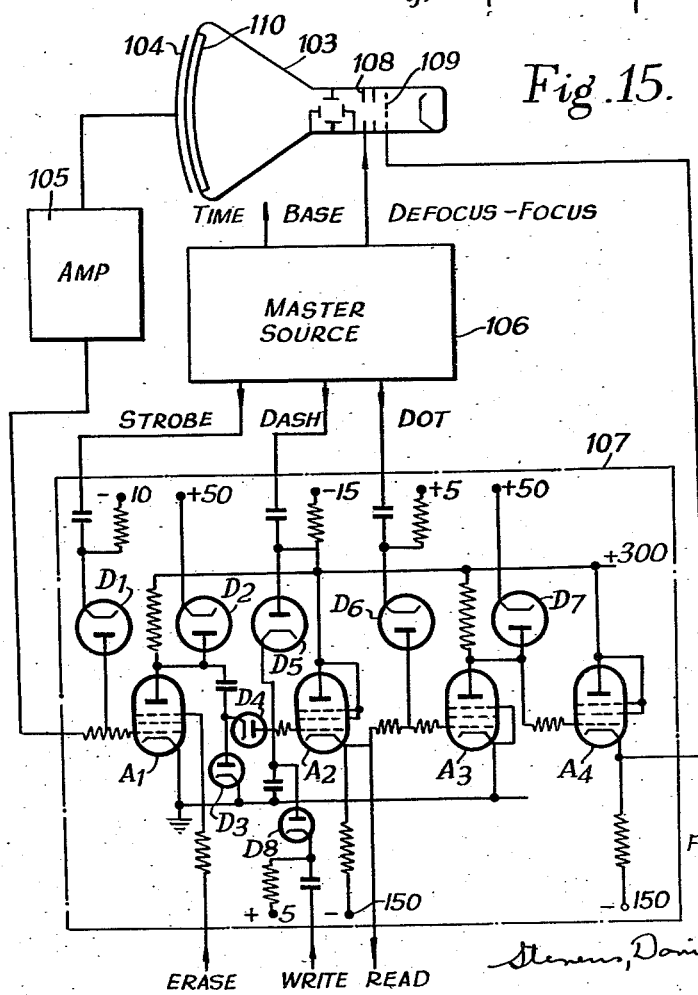

Figs. 9a–f are wave forms appropriate to the gate circuits of Figs. 9 and 15.

Fig. 10 is a diagram showing in detail one form of X time base circuit with pause during dot period which may be used in block 12 of Fig. 7.

Figure 11:
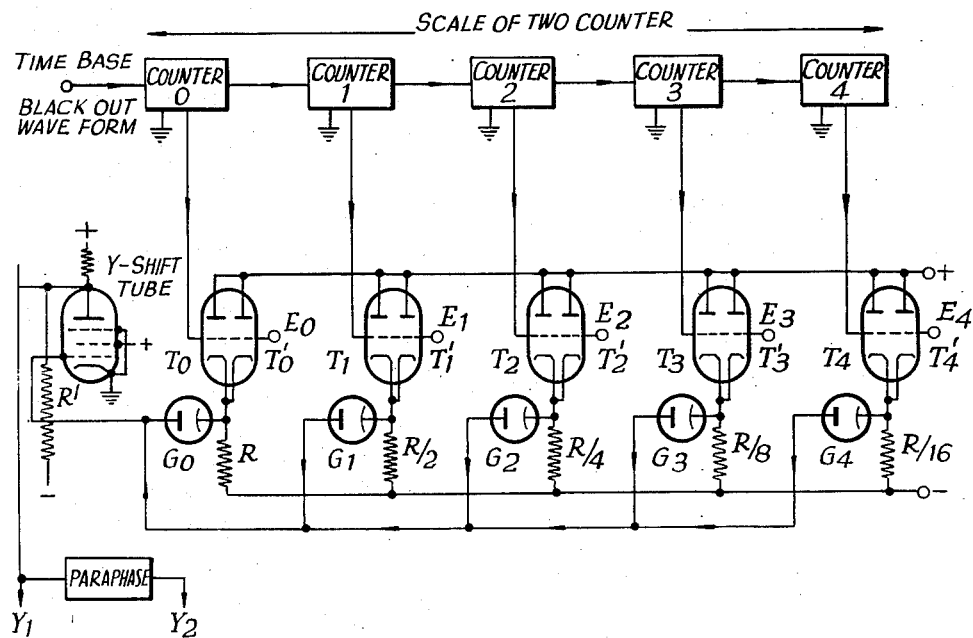

Fig. 11 is a fragmentary representative diagram of one form of Y-shift generator which may be used in block 13 of Fig. 7.

Figure 11A:
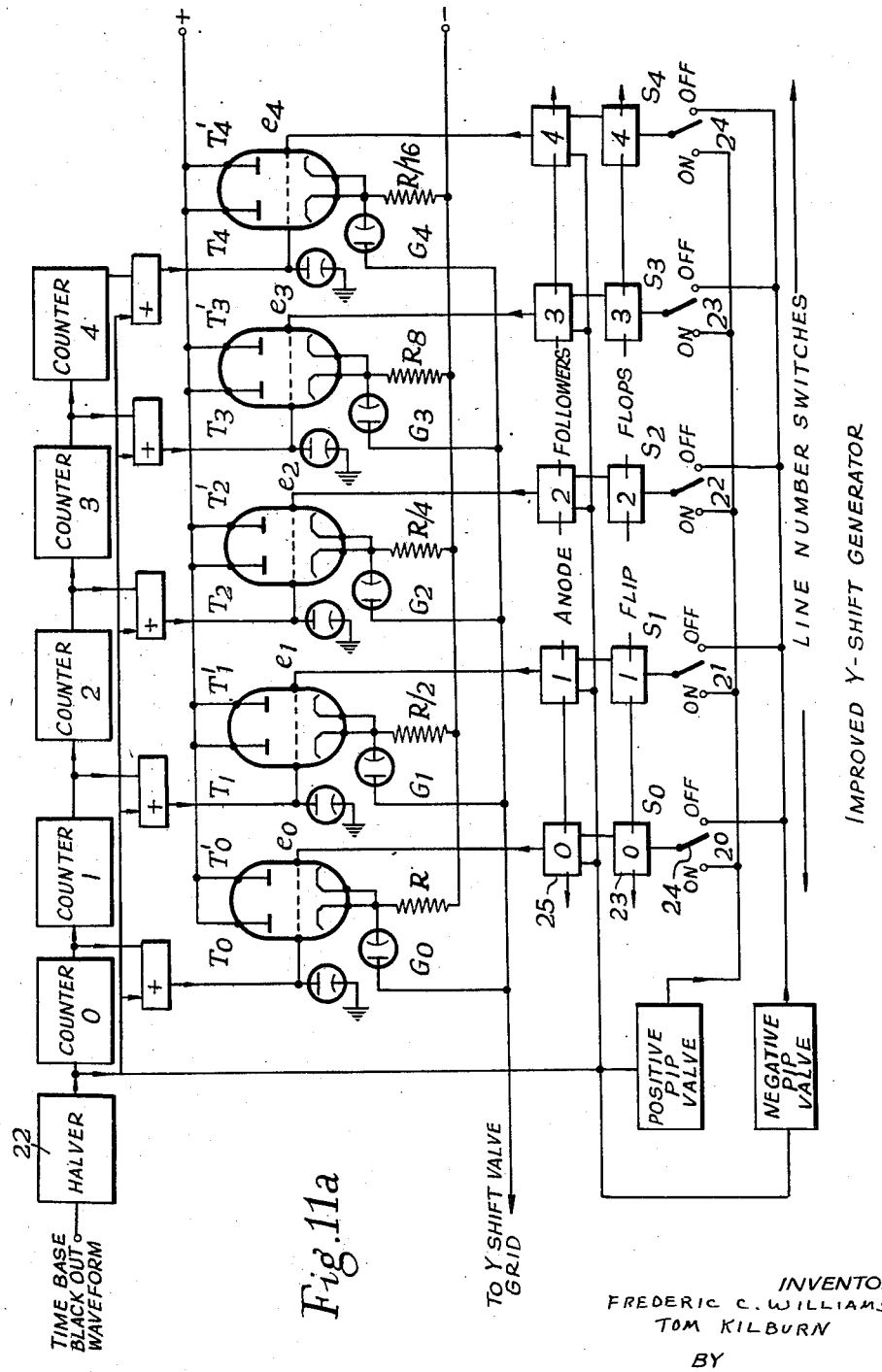

Fig. 11a shows an improved form of Y-shift generator.

Fig. 12 is a diagram of one form of stage n of a Y-shift generator as shown in Fig. 11 whereby any line "n" may be scanned at will out of its consecutive order.

Figure 13:
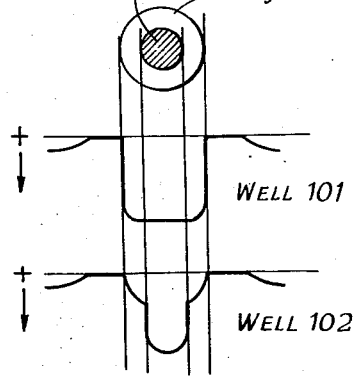

Fig. 13 is a diagram for further explanation of the theory of the present invention with particular reference to "defocus-focus."

Fig. 14 is an event diagram showing how the defocus-focus form of the invention may work.

Fig. 15 is a circuit diagram showing one form of apparatus operating with defocus-focus.

Figure 16:
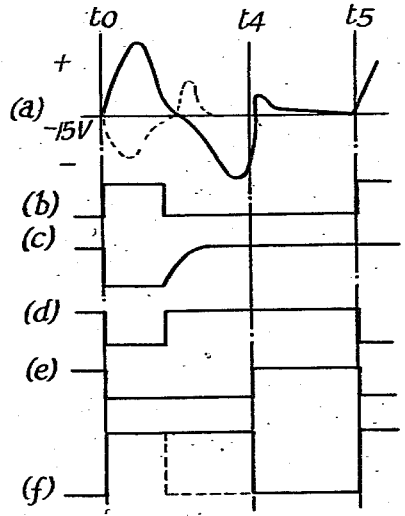

Fig. 16 is a diagram showing waveforms occurring in the operation of the gating device of Fig. 15.

Fig. 17 shows an alternative form of gating circuit for use in the arrangement of Fig. 15.

Fig. 18 is an explanatory diagram concerning a modification of the defocus-focus system.

Fig. 19 is an illumination diagram obtainable with the modification described with reference to Fig. 18.

It will be convenient, before discussing particular embodiments of the invention, to consider in more detail the discoveries on which it is based.

The screen surface of a cathode ray tube may be made to have a secondary emission ratio greater than unity under selected conditions of operation. Thus when the beam falls steadily on a single spot on the screen, that spot first moves positive, because more secondaries leave the spot than there are primaries arriving; but when the spot becomes more positive than the most positive electrode in the tube (usually the third anode) secondaries are attracted back to the spot, and the effective secondary emission ratio falls until it is unity; in this equilibrium condition, the potential of the spot has a steady value of some few volts positive relative to the third anode, adjacent areas of the screen being slightly negative relative to the third anode because of the rain of secondaries to which they have been subjected. The time taken to establish equilibrium depends on the capacity of the screen surface, the current density of the beam, the secondary emission ratio and the law governing the return of secondaries to the bombarded spot as a function of the potential of that spot relative to the third anode potential. Experiments indicate that the beam may be regarded as an ohmic resistance to the first order of approximation, and the time constant formed by this resistance and the screen capacity is of the order of 1 microsec. or less. In conditions of equilibrium there is no net current to the screen surface, which is here assumed to be a perfect insulator; the secondary emission is then exactly equal to the primary current.

Suppose now that there is a metallic pick-up plate on the outside of the face of the tube which bears the screen, the plate being earthed through a small resistance coupled to an amplifier, and the arrangement being such that the output voltage of the amplifier has the waveform of the current flowing from the pick-up plate to earth; and suppose that the beam current is turned on and off in a regular, repetitive fashion by a bright-up square wave whilst the spot is held stationary. After some time, assuming that there is no leakage between successive bright-ups, the spot will have assumed its equilibrium positive charge, and at each successive bright-up, no redistribution of screen surface charge will take place. Hence there will be no contribution to the amplifier output due to a change in surface charge. However, when the beam is turned on, a number of electrons, in the beam itself and in the cloud of secondaries returning to the third anode, are suddenly introduced in the vicinity of the pick-up plate. This is equivalent to suddenly bringing a negative charge near the pick-up plate, and a transient negative current flows in the resistance due to induced charge on the plate. The electron cloud is introduced extremely rapidly if the square wave is sharp, and the shape of the amplifier output pulse will be defined entirely by the transient response of the amplifier. When the beam is turned off by the square wave, the electron cloud is suddenly removed, and an equal and opposite positive pulse appears at the amplifier output. The size of these pulses will depend only on the beam current, and not on the spot size. Their amplitude will therefore depend mainly on the brilliance control and hardly at all on the focus control.

The amplifier output under these conditions is indicated in Fig. 1(b) of the accompanying drawing, in which Fig. 1(a) illustrates the bright-up waveform by which the beam current is modulated. Fig. 2 shows schematically the potential distribution at, and around the bombarded spot under equilibrium conditions.

Figure 3:
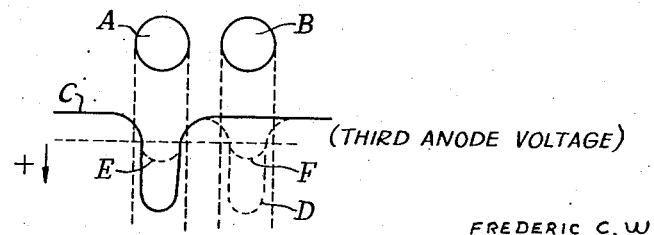

Suppose now that arrangements are made to bombard in succession two spots such as A and B, Fig. 3, about 1.25 spot diameters apart. This can be achieved by modulating the beam current by a waveform as shown in Fig. 4(a) whilst deflecting the spot under the control of a square wave of one half the frequency of that in Fig. 4(a), phased as shown in Fig. 4(b). When the beam impinges on spot A, a charge distribution as shown by the full line C, Fig. 3, will be set up. The beam is now turned off and then turned on again in position B. The newly bombarded spot will rapidly move positive, and the positive "well" (shown by the chain-dotted line D) will be generated. Some of the secondary electrons thrown out in the process will be attracted into the well left by the beam under spot A and will "fall" into it and begin to "fill it up" (dotted line E). Even after the well under B has reached equilibrium depth, which it will do very quickly, the emitted secondaries can still fall into the A well and continue filling it up. How far it will fill is not at present known. The fuller it gets, the less likely are secondaries from the well under B to reach it. After equilibrium has been reached, the beam is turned off, moved back to A and turned on again. The A well is rapidly re-excavated to full depth, and the well left at B is re-filled to some extent as before as shown by the dotted line F. This process of excavating one well and partially filling the other can be repeated indefinitely, and if the system is symmetrical, the charge thrown out of one well will equal in magnitude that deposited in the other, since the charge thrown out was deposited during the previous half cycle of operation.

If the precise electrons emitted in excavating one well went immediately to the filling of the other, no signal would be collected at the collector plate, ignoring for a moment the contribution from the electron cloud described with reference to Fig. 1. In fact, however, the excavation process is much more rapidly than the filling process, as would be expected, for whereas all emitted secondaries emerge with velocities away from the bombarded spot, only a fraction of them have velocities towards the well being filled.

Treating the two effects separately, there is obtained firstly, the waveform at the amplifier output terminal due to excavation of one well and then of the other (the contribution of the electron cloud being still ignored). When the beam is turned on, the net current leaving the bombarded spot is of a magnitude depending on the primary current $Ip$ and the ratio $$\frac{Is}{Ip}=n$$

where $Is$ is the total secondary electron emission. The relevant value of $n$ is not likely to correspond with the drawing off of all the secondary electrons emitted, since it is probable that the bombarded spot is still positive relative to the third anode and to adjacent areas of the screen apart from the other well; $n$ must, however, exceed unity, since some filling has occurred since the previous equilibrium state which corresponded with $n=1$. The bombarded spot, therefore, moves positive, and the well is deepened. As the well deepens, $n$ will fall towards its equilibrium value of unity, so that the rate of change of potential of the bombarded spot begins to fall at once from its initial value towards zero. The corresponding current in the pick-up plate resistance, therefore, rises instantaneously to its highest positive value, and then falls towards zero, apparently roughly according to an exponential law corresponding with the resistive beam impedance. The waveform of this part of the current is shown by Fig 4(c).

The waveform (Fig. 4(d)) due to the simultaneous filling of the adjacent well is of similar shape, but is of opposite sign and has a smaller amplitude and a longer time scale. The area under curves (c) and (d) is, however, the same and in this respect the curves of Fig. 4 are not to the same scale. The net waveform, still excluding the electron cloud effect, is the sum of (c) and (d) and is shown at (e) in Fig. 4.

If it is assumed that spot size determines the diameter of the well, and that the secondary emission velocities determine its depth, and also the extent to which the adjacent well is filled, the variation of magnitude and time scale of waveform e as a function of brilliance and focus may be assessed as follows:

With given beam current, de-focusing to twice the diameter (accompanied by an appropriate adjusting of the magnitude of the shift square wave (b) so that a spacing of 1¼ diameter is retained) will result in increasing the area of the charge surface by a factor of 4, but this area will move positive at ¼ of the speed since the beam density has been reduced by 4. The waveform will therefore be of equal amplitude, but the time scale will be multiplied by 4. If the beam current is increased by a factor of 2 with constant spot size, the dimensions of the well will remain unchanged but the rate of change of potential will be increased by a factor of 2. This will yield a waveform having twice the amplitude, but with the time scale halved. From these considerations it follows that the area contained under the positive and negative halves of the waveform (which are equal and opposite) will be proportional to the area of the spot and independent of beam current, but the time scale with fixed spot size will be inversely proportional to beam current. These findings assume that the amplifier can respond infinitely rapidly. In fact it cannot, and since the waveform $e$ is balanced, having equal positive and negative areas, if the time scale of the waveform is made short compared with the amplifier response time by sufficiently increasing the beam current, the waveform $(e)$ will tend to vanish. This is not true of waveform $b$ of Fig. 1, each pulse of which must always contain an area related to the magnitude of the negative cloud, no matter how big that cloud may be or how rapidly it is instated. Hence, as the brilliance is increased, the waveform of Fig. 1($b$) will increase indefinitely in amplitude, but that of Fig. 4($e$) will only increase until it becomes too rapid relative to the response time of the amplifier, after which it will decrease.

Figure 1:
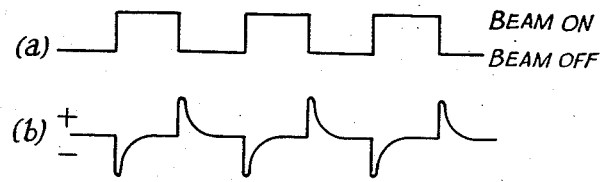
Figure 2:
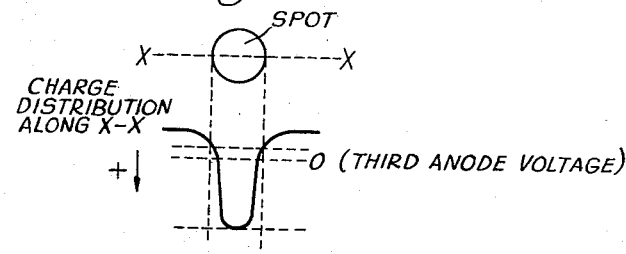

The net waveform seen at the output of the amplifier in the experiment illustrated in Figs. 3 and 4 is the sum of Fig. 1($b$) and Fig. 4($e$), and is typically as shown in Fig. 4($f$), though many variations are possible by adjusting of brilliance and focus; the netpulse at the instant of bright-up can, in fact, be made negative if the brilliance is sufficiently increased, since the electron-cloud effect (producing a negative pulse) may be made to predominate.

So far, it has been assumed that the two bombarded spots were at a distance apart of some 1.25 spot diameters. A further experiment remains to be described, in which the separation of the spots was increased from zero, the beam current and focus being held at suitable constant values.

When the separation is zero, the conditions are, of course, the same as existed when bombardment of a single spot was discussed above, so that the signal pulse at beam turn-on is negative, due to the electron cloud effect above referred to, as in Fig. 1($b$). As the separation increases, this negative pulse diminishes and becomes zero with a separation of about 0.69$d$ between the spot centres, $d$ being the diameter of the spot. It appears again sharply at a spacing of about 1.33$d$ when the separation is still further increased. Meantime, the effect of secondary emission on beam turn on begins to grow as the separation is increased from zero, since the well excavated at the first spot begins to be partially filled in when the second spot is bombarded and "re-excavation" takes place when the first spot is again bombarded. This effect, which gives rise to a positive space pulse in the amplifier, increases steadily as the separation is increased, reaching the flat maximum at a separation of about $d$ between the spot centres. Thereafter, it falls off rapidly, and becomes zero at about 1.33$d$. These two effects are shown as two separate curves in Fig. 5, which takes account only of the conditions at beam turn on. The overall result as a signal pulse in the amplifier, therefore, becomes a negative pulse at zero separation, substantially zero signal at about 0.35$d$, a maximum positive pulse at about $d$ and a negative pulse at about 1.33$d$.

The timing and the shape of the pulses shown in Fig. 1($b$) and Fig. 4($e$) are, however, not quite identical, the negative pulse being the sharper and earlier of the two. Hence, when they are of equal amplitude and are added, the result is not zero but a small negative pulse followed by a small positive pulse. It is for this reason that the amplitudes of the positive and negative pulses, due to the two effects, are considered separately and are plotted separately in Fig. 5. The negative pulse only becomes zero when the positive pulse is quite appreciable in magnitude.

It will be clear from the experimental results detailed above that if the beam is turned on at a certain spot S on the screen of a cathode ray tube, a positive or negative pulse may appear in the output of the pick-up plate amplifier, at the instant of turn on, the sign of the pulse depending on whether another spot within a critical distance of S (1.33$d$ in the experiments) has or has not been bombarded since the spot S was last bombarded. Further, it will be clear that information derived from spot S can be used regeneratively as follows:

If a positive pulse is obtained, it can be used to actuate a circuit which shifts the spot through a distance, say $d$, allows it to rest there and then extinguishes the beam. Then the next time spot S is tested, it will again give a positive indication. If S gave a negative signal, the circuit would be arranged not to introduce a shift, but to extinguish the spot whilst still at S: returning to the spot S would then give a negative indication provided no other bombardment within the critical distance of S had taken place in the meantime. Provided arrangements are made to return to S and regenerate the information there so frequently that significant leakage does not occur, the spot S will retain either its positive or its negative indication.

The surface of the cathode ray tube screen can contain many such spots as S, and provided they are arranged to be at least the critical distance away from each other, there will be no mutual interference. Each spot can yield either a positive or a negative signal, and may be caused to do either by overriding the regeneration circuit described above by means of an input pulse which is timed to coincide with the instant of turn on of the beam, and is either positive or negative as desired.

Since the permissible separation between spots is a function of spot diameter, the number of digits that can be stored in a computer on a surface of given size will depend on the accuracy of focus. With ordinary commercial cathode ray tubes, it is found possible to store a thousand digits on the 10 cm. square screen area available with 6" tubes, using optimum focus. If the focus could be more perfect, more information could be stored, but the process cannot be continued without limit since the magnitude of the signal is proportional to spot area and will ultimately become less than noise. With the conditions stated above, the signal is much greater than noise. It is found, however, that there are some imperfect spots on the screen surface of commercial tubes which give consistently wrong indications. The incidence of these is about four per thousand spots using VCR.97 tubes. The cause of these imperfections is not yet known, but their effect can be minimised by using less than optimum focus, so that the stored signal is increased and the small imperfection is used in conjunction with a considerable area of sound screen. The imperfections cease to be troublesome with de-focusing such that 1,000 digits are stored on the screen of a 12" tube, but if the source of the imperfections is discovered and eliminated, as many as 10,000 digits might be stored on the screen of a 12" tube.

The experimental basis of the invention having now been described, those versed in the art will readily be able to appreciate the nature of the invention, and many storage systems partaking of the nature of the invention will suggest themselves. Certain specific storage systems, designed for digital computers, will however be described by way of example.

In what follows, it will be assumed throughout that the storage surface is the screen face of a cathode ray tube; evidently, one advantage of such an arrangement is that operations can be visually monitored; but it must be borne in mind that storage may if desired be effected on any other suitable surface, such for example, as the surface of a mica sheet arranged to be scanned by the beam.

In one system according to the invention, a television-type raster having 32 lines is repetitively drawn out on the tube face, each line occupying 320 microsecs. If the beam is turned on for 1 microsec. every 10 microsecs., synchronously with the sweep, each line appears as 32 dots, since the spot only traverses a fraction of its diameter during the interval of bright-up. While these conditions exist, the bombardment of each spot in turn will give rise in the pick-up plate amplifier to a negative signal, since for each spot no adjacent area has been bombarded, and the conditions are as first described with reference to Fig. 1(b). If, however, a further interval of bright-up of 4 microsecs. is added to each initial microsec. of bright-up, the dots are replaced by short lines; now a positive pulse is obtained at the instant of each subsequent bright-up, since the spot bombarded has had bombardment in the vicinity since it was itself last bombarded, the bombardment of adjacent spots having occured in drawing out during the previous scan the line starting from the spot. Such a system can be arranged to "remember," "dots" and "dashes" indefinitely provided it is arranged that when a negative pulse is obtained from the amplifier the additional 4 microsecs. of bright-up is suppressed, but is allowed to occur when the amplifier output is zero or positive. In a simple alternative arrangement, the occurrence of positive pulses may be caused to introduce the additional 4 microsecs. of bright-up which is absent with zero or negative pulses. In either event, one line of the raster will appear as in Fig. 6: the binary principle it represents is written below (the convention that dot and dash represent 0 and 1 can, of course, be reversed if desired).

An important feature of this embodiment of the invention is that the amplifier output voltage is gated by a 1 microsec. pulse synchronous with the time base and with the instant of bright-up which permits the pulse-pick-up on the instant of bright-up alone to influence the question of bright-up or blackout during the ensuing 4 microsecs. If such a system is scanned at the rate of one complete raster every 50th of a second, so that all the stored information is regenerated fifty times a second, no spreading of charge due to leakage is observed. The synchronous gating of the amplifier at the instant of bright-up ensures that spread cannot be cumulative from scan to scan.

Such an arrangement is illustrated in block schematic form in Fig. 7. The arrangement shown in this figure comprises a cathode ray tube 1, on the electric charge-retaining screen 25 of which the charge pattern constituting a store of information on binary principle is built up. The tube comprises a cathode 2, a control grid 3, first and second anodes 4 and 5, a third anode 6 constituted by a conducting coating on the inside wall of the tube, and a signal pick-up plate 7 on the outside wall of the tube adjacent the screen. Two pairs of conjugate deflecting plates 8, 9 are provided to deflect the beam in two co-ordinate directions. The second and third anodes are held at earth potential, the remaining electrodes having suitable negative potentials to cause the tube to operate at a beam velocity such that the ratio of secondary electrons struck out from the screen to primary electrons arriving is greater than unity.

A generator 10 of rectangular pulses produces regularly recurring pulses which are to be used to synchronise the operation of all the correlated parts of the apparatus. These pulses are fed to a divider circuit 11 which counts down by a suitable factor to provide synchronising pulses for the two time base circuits 12, 13 which feed deflection voltages to the pairs of plates 8 and 9 respectively to set up a raster of 32 horizontal lines. Blackout during the return strokes between lines is provided by means well known in television circuits, for example, and omitted from the drawing for the sake of clarity. Each line is divided into 32 elements by a blackout waveform applied to the control grid 3, the elements being illuminated dots or dashes according to the information to be stored. This latter blackout waveform is derived from a switch circuit 14 in the following way. Pulses at the appropriate recurrence times for each element and of short and long duration corresponding to dots and dashes are generated in circuits 15 and 16 respectively, both of which are controlled by pulses from the pulse generator 10. The switch circuit 14 is controlled in turn by signals selected from the output from the amplifier 17, connected to the signal pick-up plate 7 on the tube 1, by a gate circuit 18. The switch circuit 14 is arranged normally to pass the dot waveform from 15 to the control grid 3 but is switched to pass the dash waveform from 16 when a positive pulse appears at the pick-up plate 7. The gate circuit 18 is controlled by a strobe circuit 19, which is fed with the dot waveform and ensures that the gate 18 passes a signal from the amplifier to switch circuit 14 only at the moment of bright-up of the cathode ray tube beam.

Figure 8:
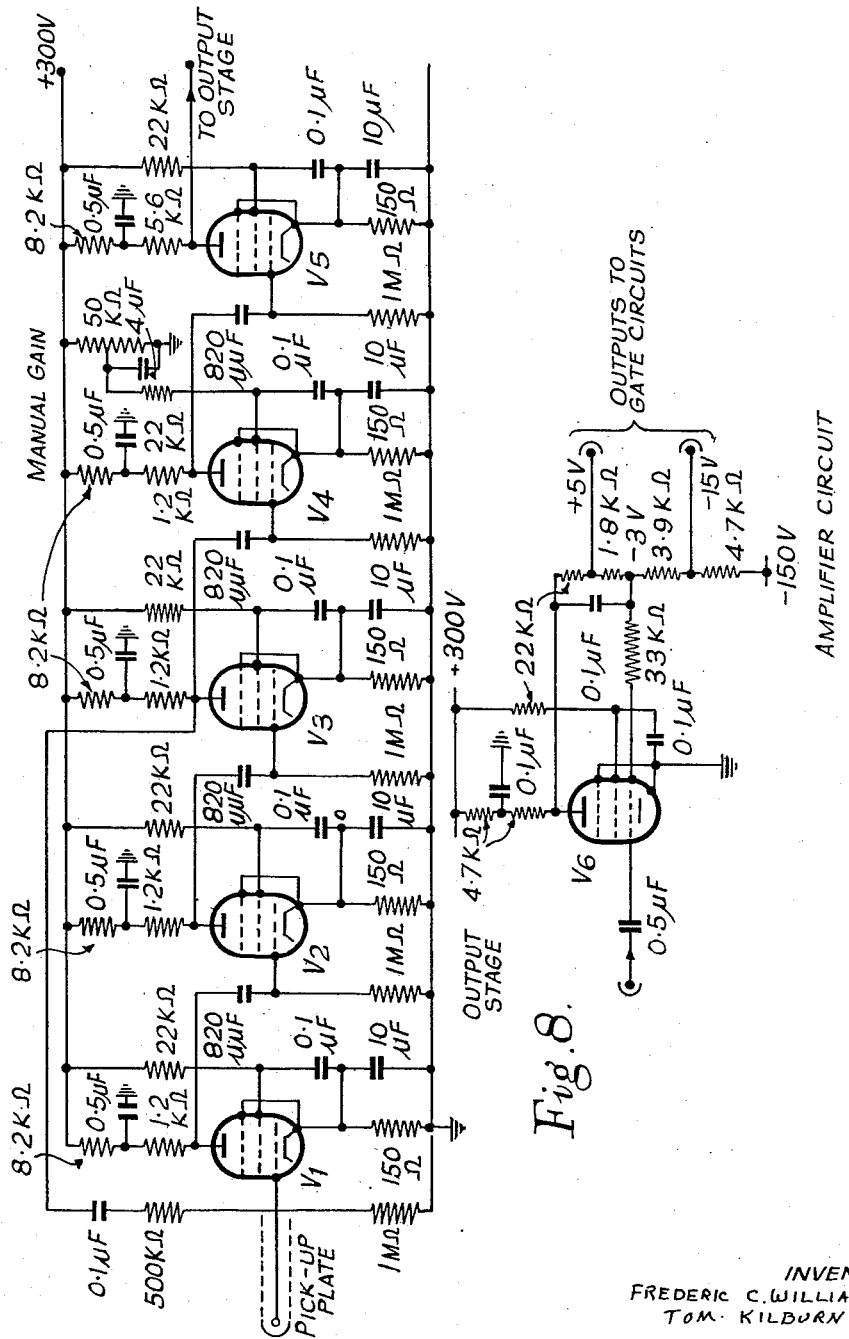
Fig. 8 is a diagram showing in detail one form of amplifier which may be used in block 17 of Fig. 7.

In the amplifier circuit of Fig. 8, tubes $V_1$ through $V_5$ are of the type known at CV1091 and $V_6$ is type CV173. Each stage of the amplifier is separately screened and the heater, grid and plate supplies are fed to each stage through suitably filtered leads to prevent high frequency oscillations.

The first three stages are identical and are fed back by a resistor of 500 K$\Omega$ connected between the anode of $V_3$ and the grid of $V_1$. The feed-back reduces the effect of microphony voltages in $V_1$ to negligible proportions and defines the output voltage of $V_3$ as $0.5i_s$ volts, where $i_s$ is the signal current in microamperes provided by the pick-up plate 7. The fourth stage is controlled by its screen-grid voltage to give manual gain-control. The anode load of the fifth stage is very much greater than the input impedance of the sixth stage. Consequently, almost all the pulse current delivered by $V_5$ flows in the 33-K$\Omega$ feed-back resistor of stage 6. Stage 6 is directed current fed back, as shown, to provide outputs with approximate levels of either $+5$ volts or $-15$ volts, direct current.

The voltage output of the amplifier is $100i_s$ when the manual gain is set so that the voltage gain of the last three stages is 200.

One form of gate circuit is shown in Fig. 9. The effect of this circuit is to provide the grid of the cathode ray tube with narrow positive pulses, to give a standard display of dots corresponding to the digit "0." These pulses are made wider, producing a dash corresponding to the digit "1" if, and only if, the circuit receives a positive pulse from the amplifier at specified instants, the instants at which the beam is switched on.

The standard display is provided by narrow negative dot pulses, Fig. 9(d), applied to the cathode of the diode $D_6$, the cathode being biased positive with respect to its anode. These pulses cut off the control grid of $A_3$, and the anode of $A_3$, which was bottomed, rises quickly in voltage until caught by the diode $D_7$ at about $+50$ volts. The resultant anode waveform, shown dotted at Fig. 9(f), is cathode followed by A, and applied to the cathode ray tube 3 through a direct current restoring circuit, which defines the highest voltage reached by that grid, as the voltage set up on the brilliance control of the cathode ray tube. Blackout of the X time-base recovery sweeps or flyback is provided by inhibiting the dot pulses at their source during the blackout period. This is also true of the dash and strobe pulses.

The tubes $A_1$ and $A_2$ and their associated diodes are the true gate circuit. The output of the amplifier 17, shown in Fig. 9(a) and biased to $-15$ volts, is fed to the grid of $A_1$ only during the strobe intervals defined by the strobe pulses in Fig. 9(b). At all other times this is prevented by conduction of $D_1$. A strobe interval is a short interval occurring immediately after the beam is switched on by the pulses shown in full or dotted lines in Fig. 9(f). There is normally no anode current in $A_1$, and the anode voltage is defined as $+50$ volts by the diode $D_2$. The anode waveform, Fig. 9(c), has a negative pulse for every positive pulse delivered by the amplifier during a strobe interval. The negative pulses are cathode followed by $A_2$ through the diode $D_4$, and applied to the control grid of $A_3$. The upper voltage limit of the control grid of $A_2$ is defined as 0 volts by the conduction of $D_4$ and $D_3$, and its lower limit is defined as $-15$ volts by conduction of $D_5$. The condenser taken from the control grid of $A_2$ to earth prevents the grid changing its voltage unless it is driven. The grid is driven to and remains at $-15$ volts for an interval, the dash interval, determined by negative-going parts of the waveform of Fig. 9(e) applied to the anode of $D_5$. It will then be driven to 0 volts by the positive-going trailing edge of the dash pulse and will remain there until it receives another negative pulse from the anode of $A_1$.

The action of the gate circuit may be summarised as follows. If the display at a certain spot on the cathode ray tube was previously a dot, a negative pulse will be delivered by the amplifier 17 during the strobe period, when the spot is again bombarded. As the control grid of $A_1$ is normally cut-off, the negative pulse has no effect and the gate circuit is inoperative. A dot is therefore produced again by the dot waveform, $D_6$ and $A_3$. The corresponding waveforms are shown by the dotted lines in Fig. 9(a)–(f). If the display was previously a dash, a positive pulse from the amplifier gives rise to anode current in $A_1$. The resulting negative pulse at the anode of $A_1$, takes the grid of $A_2$ to $-15$ volts where it remains until driven back to 0 volts by the dash wave form acting through $D_5$. The grid of $A_3$ is therefore cut off initially by the dot waveform and held off for a dash interval by the cathode of $A_2$ reproducing the dash display.

A convenient "read" output for the storage unit is derived from the cathode of $A_2$, and it takes the form of a negative pulse of dash width for each stored "1." External information, represented in this manner, can be written into the storage unit by applying it to the cathode of $D_8$. Each negative pulse extends a dot into a dash. When writing new information over old information on the screen of tube 1, it is also necessary to convert a dash into a dot. This is achieved by applying a negative waveform to the suppressor grid of $A_1$, which cuts off the anode current in $A_1$ during the writing interval, breaks the regenerative loop and allows completely new information to be inserted through $D_8$.

A clock circuit embodied in the generator 10 of Fig. 7 for the production of a digit cycle, for example 8.5 $\mu$ sec., is provided and comprises an LC oscillator, squarer and cathode follower. The strobe and dot and dash waveforms are produced from the square wave and fed to the gate circuits from low impedance sources.

Two phantastron circuits in series, dividing four and nine respectively, may form part of the circuit 11 in Fig. 7 and are triggered by the clock waveform from 10. The outputs of the phantastrons are used to produce a square waveform, which is positive for four clock intervals and negative for thirty-two clock intervals. This is the X time-base blackout waveform and it is used to control the X timebase circuit 12 and Y-shift generator 13 of Fig. 7.

Fig. 10 shows a time-base followed by an anode-follower circuit to provide the paraphase. A linear sweep is produced starting at a potential defined by a diode.

The alternative sweep for dot-dash storage pauses during the dot interval. This is achieved by returning the time-base grid leak to the dot waveform and restoring with direct current the waveform with an inverted diode to a potential equal to the mean grid-potential during the sweep. During the dot interval no current flows in resistance R of Fig. 10 and the rate of sweep is therefore zero. If E is the amplitude of the dot waveform, the rate of sweep at all times is $E/RC$.

The sweep required for defocus-focus storage to be described later pauses during the dash interval and is achieved as above described with reference to Fig. 10 by using the dash waveform instead of the dot waveform.

Fig. 11 shows a simple form of Y-shift generator. Along the top of this figure is the five-stage scale-of-two counter, each stage being triggered from the previous one: the first stage is triggered by the X time-base blackout waveform. Each counter $n$ ($n=0$, 1, 2, 3 or 4) is associated with a triode $T_n$ which has a resistance $R/2^n$ in its cathode lead, and the cathode of the triode is connected through a diode $G_n$ to the grid of a pentode called the Y-shift tube. The output of the Y-shift tube and its paraphased version are applied to the Y-plates of the cathode ray tube. Paraphase is obtained by see-saw or anode-follower circuit. The circuit is completed by triode $T_n{}^1$ whose cathodes are also connected to the resistors $R/2^n$. For the moment it will be assumed that the currents in these triodes are cut off by negative voltages $E_n$. The outputs of the counters 0 to 4 are added together in the proportions 1, 2, 4, 8, 16 . . . $2^{n-1}$ respectively, yielding a step waveform as a resultant output. This step waveform is the output voltage of the paraphase of the Y-shift valve, since each time a triode $T_n$ is cut off by the negative-going half-cycle of the waveform of counter $n$, a current proportional to $2^n/R$ flows into R through $G_n$. The Y-shift valve operates as a fedback adding circuit, adding contributions from $R/2^n$ whenever $G_n$ conducts. $R^1$ is chosen to give suitable Y-shift.

It follows from the above discussion that if the grids of the triodes $T_n$ have negative voltages applied to them, which are sufficient to cut off tube currents, then the line of the raster scanned by the time-base can be chosen at will by applying suitable voltage $E_n$ to the triodes $T_n{}^1$. For $E_n$ can be chosen so that $G_n$ either does or does not conduct, the fifth power of two possibilities, and if $G_n$ conducts a contribution $2^n$ is made to the line number. If, for example, with the convention that the first line in the raster is called 0, it is desired to scan line 21, then $E_1$ and $E_3$ are made positive and $E_0$, $E_2$ and $E_4$ are made negative. Only the diodes $G_0$, $G_2$ and $G_4$ conduct and a Y-shift of 21 ($2^0+2^2+2^4$) units is produced. It will be observed that the line chosen by operating the triodes $T_n{}^1$ and the corresponding line of the raster produced by the triodes $T_n$ are accurately the same, since they both depend on the resistors $R/2^n$ and not on the triodes involved, provided the triodes are actuated by sufficiently large potentials.

The requirement for prompt execution of an instruction by reading or writing leads to the division of the raster operation into the two phases called "scan" and "action," control being exercised by waveform applied to the grids of the triodes $T_n$ and $T_n{}^1$.

The modifications necessary to make the circuit of Fig. 11 conform to the above requirement are shown in Fig. 11(a) and are included here for clarity and completeness. They will be claimed in a copending application. In Fig. 11(a) the blackout waveform triggers a halver circuit 22, which, in turn, triggers the five-stage scale-of-two counter. The halver circuit is itself a scale-of-two counter. The halver waveform is added to each of the counter waveforms, and the resulting waveforms are applied to the grids of the triodes $T_n$, after being restored to earth potential by direct current. In other words, the greatest voltage achieved by any of the waveforms is zero volts. Further, the waveforms have sufficient amplitude to prevent current flowing in the triodes $T_n$ except during those half cycles of the halver waveform during which they are at zero volts. Now if it be assumed for the moment that the potentials $e_n$ applied to the triodes $T_n{}^1$ are sufficiently negative to prevent current flowing in $T_n^1$, it will be seen that during the scan phase current flows in all the triodes $T_n$, so that the diodes $G_n$ do not conduct, the Y-shift is zero and the electron beam of the cathode ray tube scans line 0. However, during the first action phase no current flows in any $T_n$, so all diodes $G_n$ conduct, the Y-shift is at its maximum value and line 31 is selected. During the second scan period only $G_0$ conducts, so that unit shift occurs and line 1 is scanned. During the following action phase all the diodes $G_n$ conduct again, so that line 31 is again selected. It will be clear from the above that the whole raster of 32 lines will be scanned sequentially, line 31 being selected to represent the action line $n$ which is regeneratively read or rewritten in changed form between scans of adjacent lines.

In order to change the action line, the direct current levels of the waveforms must be changed from 0 volts to beyond cut-off of $T_n^1$ or vice versa. These voltages must not be changed during an action phase, because, if they are, a diagonal line will be traced across the screen by the electron beam, and stored information will be wiped out. They may, however, be changed at any time during a scan phase, as they affect only $T_n^1$ which plays no part in the operation during a scan phase. It is convenient to arrange that a change in voltage can only occur at the beginning of the scan phase immediately following the throw of a switch. To achieve this, either the positive or negative pips which occur only at the beginning of scan periods, are applied to the input grids of five flip-flops 23 by means of five switches 24 as shown at the bottom of Fig. 11(a). When a switch is thrown, the corresponding flip-flop cannot change its state until it receives a pip. This ensures that change of state cannot occur during an action phase. The positive or negative voltages produced by the flip-flops are added to the halver waveform by anode followers 25.

Stage "n" of the schematic diagram of the Y-shift generator of Fig. 11(a) may take the form shown diagrammatically in Fig. 12.

Referring again to Fig. 7, it will be seen that as the screen of the cathode ray tube 1 is illuminated at each bright-up, a signal will be generated in the amplifier 17 of a sign dependent on whether a dot or a dash was previously recorded on the tube screen at that point. If it was a dot the switch 14 will select the dot waveform from circuit 15, and terminate the bright-up at the end of the dot interval, but if it was a dash the switch 14 will select the dash waveform from circuit 16, and maintain the cathode ray tube beam switched on for a longer time, so that a dash is again recorded on the cathode ray tube screen at the point in question.

If new information is to be written into the store, this is effected by applying a suitable signal to an input terminal 20 connected to the switch circuit 14 and arranged to override the signal from the gate 18. Furthermore, it will be appreciated that the signals applied from the switch 14 to the control grid 3 of the cathode ray tube represent the information read out of the store, and may therefore be used as output signals for application to a further part of the equipment in which the information is to be employed. The switch circuit 14 is therefore shown connected also to an output terminal 21.

Some details arise to be considered in connection with the scanning system to be employed. For example, the X-scan may comprise a uniform sweep for each line with rapid fly-back, as discussed above, but it may be preferable in some cases as described with reference to Fig. 10 to employ an X-scan waveform which provides for a short waiting interval at each element position in order that a dot representation shall not be drawn out into a short line; economy of space may then be achieved. The X-scan should also be designed to provide a writing speed such that, on the one hand, a dash is of sufficient length to provide the positive signal output which distinguishes it from a dot, and on the other hand, so that the spacing between the elements will accommodate dashes while still leaving a spacing between the elements greater than the critical distance above referred to, of the order of 1.33 spot diameters so that adjacent elements will not interfere with one another.

The system may be modified in many ways. It can be arranged, by using a non-linear time-base for the spot to pause during the microsec. of bright-up so that it is truly a spot and not a very short line that is compared with the dash. Time may also be saved by scanning rapidly between the end of a dash and the position of the next dot or dash. Again, the dot and dash arrangement may be replaced by a single dot or double dot by using an appropriate time-base waveform.

Arrangements can readily be made to interrupt the scan at any time, and read off the information on any line, or write information into it.

In a further system according to the invention, using a similar raster scan, three states of each digit mark are catered for:

(a) A dot, yielding and corresponding with a negative pulse.

(b) A short line, yielding and corresponding with a zero pulse.

(c) A dash, yielding and corresponding with a positive pulse.

In this case, the normal state of the system is that in which successive bright-ups cause the generation of "short lines," but the receipt of a negative pulse from the amplifier is arranged to curtail the short line into a dot, and the receipt of positive pulses is arranged to extend the short lines into a dash. The three states could be used to represent 0, 1 and 2, or preferably $-1$, 0 and 1 on either a binary or ternary system of counting.

The last described system is based on the fact that when two adjacent areas are bombarded which are spaced by a short distance only (for example, $0.35d$, see Fig. 5) the amplifier output during each subsequent bright-up contains a portion in which a small negative pulse is followed by a small positive pulse; effectively, by comparison with the pulses due to dots and dashes, this is an approximately zero output, and can be gated out. In such an arrangement, dots give a negative output and dashes (representing the bombardment of more widely spaced areas) give a positive output. Clearly, should the short line corresponding to zero output tend to shorten or lengthen, the output will become negative or positive respectively; accordingly, it is proposed to devote a part of the raster to the recording of a series of short lines which, when subsequently re-explored, will yield a signal which can be employed to control automatically the length of the short lines so that they always give rise to a zero output.

The scanning systems so far described are most suitable for computers in which the digits of a given number are arranged sequentially in time, one complete number being stored on each line. Those are called series or sequential systems. Some computer designs are based on a parallel mode of operation in which all the digits of a given number are to be simultaneously available on different wires. Working on a basis of 32 digits per number, 32 tubes of the type described above might be used, one digit of each number occupying one space on each tube. With this arrangement, the digit occupying the 32nd space in any line only becomes available once every 320 microsecs. when the scan is of the raster type. This time can be reduced by splitting the scan into 8 columns of short lines each containing 4 digits, and with arrangements made to read any digit in any line at any time. This would reduce the time to obtain any digit to 40 microsecs.

Alternatively, the time sweep may be done away with altogether and replaced by a deflection signal generator which is arranged to sweep a spot discontinuously from space to space on the tube face by means of appropriate X and Y voltages. A further arrangement would be necessary to draw the spot out into a short line if positive pulses were obtained at the instant of turn on. Provided the deflection generator could be switched to any desired spot rapidly, and digit could be recovered at any time; the appropriate shift voltage could probably be generated with the required accuracy in some 20 microsecs.

In a further system according to the invention, which is particularly suitable to the step by step arrangement last described, the beam is turned on at a given spot in a de-focused state; if a positive pulse results, the spot is focused sharply before moving on to the next spot. The sharp focusing has the result of "filling in" the peripheral parts of the big well formed by the defocused spot and leaves only the central part under the sharply-focused spot of full depth. When a de-focused spot is turned on again at this point, a positive pulse will result, since the well must be re-emptied again to full diameter. If a negative pulse is obtained from a given spot, the spot is left de-focused up to the instant of turn off, and then a negative pulse will be obtained on the next visit to this spot. In view of its importance this "defocus-focus" system will be described in detail.

The defocus-focus form of the invention provides a storage system which is of particular (but not exclusive) application under conditions in which it is not desired to perform all reading or writing operations while conducting a continuous scanning of the charge storage surface by the cathode ray beam, but in which, as already mentioned, it is arranged that the cathode ray beam should rest or pause at each discrete area upon which an element of information is to be stored. Such a discontinuous mode of operation may be particularly applicable to storage units embodied in digital computing machines operating in the so-called parallel mode in which all the digital elements of a number or "word" are required to exist simultaneously in the form of electrical signals.

The basic principle upon which the defocus-focus system depends is the difference in the nature of the charge residing at a discrete area of the recording surface in a cathode ray tube when (i) the discrete area alone is irradiated, and (ii) when adjacent areas, not spaced from the discrete area by more than a critical distance are irradiated after the irradiation of the discrete area.

In operating the defocus-focus system the two states of charge distribution at a given area on the recording surface are obtained by two differing sequences of bombardment of the area by the cathode ray beam, namely: (i) bombardment with a defocused beam giving a spot covering a large area; and (ii) bombardment with a defocused beam followed by bombardment with a focused beam providing a small diameter spot which lies within the outer boundaries of the area covered by the large diameter spot.

The charge distributions and output signals derived from the signal pick-up plate resulting from this defocus-focus mode of operation will be briefly described with reference to Figures 13 and 15 of the accompanying drawings. In Fig. 15 there is used a gate circuit closely resembling that described with reference to Fig. 9. When a defocused beam (a) is turned on for the first time at a given spot a well 101 of positive charge will be excavated in the charge distribution on the recording surface. An initial pulse, which may be taken as positive (it will be negative if the amplifier produces a reversal) will be obtained from the amplifier receiving the pick-up plate signals. If the beam is not defocused before it is extinguished then at a subsequent turn-on of a defocused beam upon the spot the amplifier output, as the well 101 is already in existence, will consist only of a negative pulse caused by the electron cloud effect. If however before extinction of the cathode ray beam it is caused to become focused as at b, then some of the secondary electrons emitted during the focused interval will partially fill up the sides of the positive charge well 101 to produce the distribution indicated as well 102.

At the subsequent instant of turn-on of a defocused beam the charge distribution of well 102 will have first to be converted to that of well 101 and a positive output pulse will be derived by the amplifier 105 from the signal plate 104. Positive or negative polarity of the output pulse at beam turn-on thus differentiates between previous bombardment of an area with a defocused beam which becomes focused and previous bombardment of an area with a defocused beam which does not become focused. The initial positive or negative pulse at beam turn-on may be employed to control circuits associated with the storage tube in such a fashion that a pattern of charge distribution once laid down may be cyclically regenerated. It is obvious that in employing the storage method to store binary digital information, either state of charge distribution and associated cycle of bombardment may be employed to represent the "0" or "1" significance, but it is important to note that the order of bombardment with defocused and focused beams cannot be reversed. The beam at the instant of turn-on must be defocused.

Figure 14 is an explanatory diagram indicating the timing and natures of the waveforms involved in producing a storage display of binary-digital information in which "0" is represented by the charge distribution produced by irradiation with a defocused beam only and "1" is indicated by the charge pattern produced by a defocused beam which becomes focused before extinction.

The X time-base waveform applied to the cathode ray tube 103 of Fig. 15 is caused to pause during its linear run down over intervals corresponding to the irradiation of each discrete area in the line on which information is to be stored. A portion of the time-base wave is indicated at (a), with a constant voltage portion from time $t_0$ to $t_4$ and a run down from time $t_4$ to $t_5$, the time of occurrence of the next digit. This waveform may be produced by a normal Miller integrator type of generator in which the grid leak resistance is taken to a point whose potential is varied, by repetitive pulses which are D. C. restored, between a value giving normal run down and a value (equal to the mean grid potential during run down) which prevents run down. The cathode ray beam is switched on at $t_0$ by one of two waves, a dot wave (g) or a dash wave (h) indicative respectively of "0" and "1," the dot wave terminating at $t_3$ and the dash wave at $t_4$. A defocus-focus waveform (j) which causes the spot to become focused at $t_3$ is fed to a suitable electrode, such as the second anode, of the cathode ray tube. The resultant displays when the dot or dash bright-up wave is fed to the cathode ray tube are indicated at (b) and (c) of Fig. 14, the "0" indication comprising a defocused spot existing from $t_0$ to $t_3$ and the "1" indication comprising a spot which exists from $t_0$ to $t_4$ but is defocused from $t_0$ to $t_3$ and defocused thereafter. It must be appreciated that the spot is stationary from $t_0$ to $t_4$. The output waveforms obtained from a signal pick-up plate associated with the cathode ray tube recording surface are indicated at (d) for the "0" and (e) for the "1." The "0" condition produces a negative initial transient and the "1" condition produces a positive initial transient. A strobe or gate pulse (f) derived from master timing circuits which also provide the waves (g), (h) and (j) and also control the time-base generator, is timed to occur just after beam turn-on and so is enabled to select a portion of the initial transient which can then be tested to discover whether it is positive or negative. The knowledge of the presence of a "1" or a "0" at a particular location on the recording surface is thus obtained before the instant of time at which action must be taken to cause a "1" to be written into the storage position. Thus the strobed signal derived from a particular element of stored information when that element is first irradiated with a defocused spot may be employed to cause the waveform (g) or (h) to be operative at the bright-up electrode of the cathode ray tube and thus regenerate the element of information.

Fig. 15 illustrates partly schematically and partly in circuit detail a storage apparatus arranged to represent elements of information corresponding to "0" as purely defocused spots and elements of information corresponding to "1" as defocus-focus spots. The gate circuit 107 closely resembles that of Fig. 9. In the external circuits associated with the store and with a computer system embodying the store the digit "0" will be represented by the absence of, and the digit "1" by the presence of a pulse of "dash" length as indicated at (h) in Fig. 14.

The cathode ray tube 103 is provided with an electric charge-retaining screen 110 and with a signal or pick-up plate 104 which is connected to an amplifier 105 and the deflecting plates of the tube are provided with a deflecting voltage comprising a linear run-down interrupted by pauses (such as $t_0$–$t_4$, Fig. 14(a)) when the beam is irradiating each discrete element of the line path of the spot which is to be used for storing an element of information. The time-base waveform is indicated as being derived from a master source 106 which in addition provides dot and dash waves, Fig. 14(g) and (h) corresponding to each time-base pause, the defocus-focus wave, (Fig. 14(j)), which is fed to the second anode 108 of the cathode ray tube and the strobe pulse wave, Fig. 14(f). During the flyback of the time-base the dot, dash and strobe waves are inhibited at the source so that no amplifier output signals are effective during the flyback and the flyback is blacked out. A "gate" circuit 107 fed with the strobe and dot and dash pulses normally feeds dot pulses to the cathode ray tube grid to produce the defocus spot "0" indications, and only if a positive signal is received from the amplifier during the strobe pulse or a special writing signal is applied at the appropriate point with dash pulses being fed to extend the bright-up period beyond the dot period and so produce the defocus-focus "1" indications.

The functioning of the circuit of the "gate" device 107 is described with reference to the explanatory waveform diagram Fig. 16. The standard pattern of indications or charge distributions corresponding to "0's" is provided by the narrow negative-going dot pulses, Fig. 16(d), which are applied to the cathode of the diode $D_6$ about a +5 volts resting level. These pulses cut off the control grid of the tube $A_3$, and the anode of $A_3$ which was bottomed rises quickly until caught by the diode $D_7$ at about +50 volts. The resulting anode waveform shown dotted at Fig. 16(f) is cathode followed by tube $A_4$ and fed to the cathode ray tube grid 109, a D. C. restoring circuit (not shown) being provided. Tubes $A_1$ and $A_2$ and the associated diodes form the true gate circuit. The output from the amplifier 105, which is indicated in Fig. 16(a) (dotted line) for the re-irradiation of a plain defocused spot ("0") and (full line) for the re-irradiation of a defocus-focus spot ("1") is biased to —15 volts and fed to the grid of tube $A_1$ only during the stroke pulses, Fig. 16(b). At all other times the grid is held by conduction of diode $D_1$, the negative bias on the cathode of $D_1$ being overcome by the positive-going strobe pulse applied at this point. The normal anode voltage of $A_1$ is held at 50 volts by a diode $D_2$ and a negative pulse, Fig. 16(c), is thus obtained at the anode of $A_1$ for every positive pulse delivered by the amplifier during strobe intervals. These negative pulses are cathode followed by tube $A_2$ through the diode $D_4$, and applied to the control grid of $A_3$. The upper limit of control grid excursion of $A_2$ is defined at zero volts by conduction of $D_3$ and $D_4$, and its lower limit is defined as —15 volts by conduction of diode $D_5$, to the anode of which negative-going dash pulses are fed from a rest level of +5 volts. The condenser C in the grid circuit of $A_2$ prevents the grid voltage changing unless driven, and the grid of $A_2$ will thus be driven to and remain at —15 volts for the duration of the negative portion of the dash waveform, Fig. 16(e). At the positive-going back edge of the dash wave the grid of $A_2$ will be driven to zero voltage and will remain there until another negative pulse is received from the anode of $A_1$.

Thus if the information stored at a particular point of the recording surface was previously a plain defocused spot ("0") a negative pulse will be delivered by the amplifier upon re-bombardment. As the control grid of $A_1$ is normally cut off this negative signal will have no effect, the gate circuit is inoperative and a dot wave, indicated by the dotted curve, Fig. 16(f), will be fed to the cathode ray tube grid, causing the regeneration of the plain defocused spot. If the information previously stored was a defocus-focus spot ("1") then the positive amplifier output pulse will open $A_1$ and cause $A_2$ to be cut off for the duration of a dash pulse. The grid of $A_3$ is thus initially cut off by the dot wave, to produce the defocused spot, and then maintained cut-off for a dash interval to produce the focused spot.

The "gate" circuit 107, in addition to providing regeneration enables the stored information to be easily read off. A convenient "read" output is derived from the cathode of $A_2$ and takes the form of a negative pulse of dash width for each stored "1." New information may also be readily written into the store over existing stored information. In order to write a "1" into a particular place a negative pulse timed to occur during a bright-up interval and applied to the cathode of a diode $D_8$ will extend the dot length bright-up interval into a dash-length interval and so write the appropriate defocus-focus spot. In order to write a "0" over an existing "1" a suitable wave is fed to the suppressor grid of $A_1$ to prevent anode current flowing in that tube during writing intervals, such a wave could be similar to a negative-going version of the dash wave, Fig. 14(h). This latter input to the suppressor grid of $A_1$ may also be considered as an "erase" input as it enables any stored information to be obliterated and replaced by the standard pattern of "0's." An alternative "write" input arrangement would consist in the application to the grid of $A_3$ via a diode of a dash waveform, equivalent to the permanent dot input, when it is desired to write a "1" into the store.

In the particular circuit arrangements described above it has been assumed that the digits or states "0" and "1" are represented by the two states of charge distribution produced by the "defocus only" and "defocus-focus" beams respectively. This selection is quite arbitrary and may be replaced by the reverse arrangement in which the plain defocused spot produces a recorded charge pattern indicative of the "1" digit or state. It is then necessary to rearrange the gating device 107 of Fig. 15 so that dash pulses are normally fed to the cathode ray tube grid to write defocus-focus patterns for "0's" and to convert the dash wave into a dot wave to cause writing of "1's" if a negative pulse is received from the amplifier during the strobe pulse following turn-on of the defocused beam.

The modified circuit of the device 107 is indicated in Fig. 17. With zero or positive pulse input from the amplifier the control grid of $A_1$ is at earth potential and its anode is at a low positive voltage, this valve being conducting. The resistance chain connected to this anode is such that tube $A_2$ is then cut off and its anode is held at a potential of +80 volts by the diode $D_{14}$. The dash waveform, in a negative-going sense from a resting level of —5 volts, fed to the anode of diode $D_{12}$ causes tube $A_2$ to conduct and bottom in the positive-going intervals between the dash pulses. In the absence of a negative pulse applied from the amplifier to the control grid of $A_1$ positive-going dash pulses are produced at the anode of valve $A_2$ and these may be fed, via a cathode follower as in Fig. 15, to the grid of the cathode ray tube to cause the production of defocus-focus beams.

When the amplifier delivers a negative pulse during the strobe pulse, $A_1$ is cut off and remains cut off owing to the long grid circuit time constant until the control grid is driven to earth potential again by the positive-going part of the dash wave applied via diode $D_{10}$. The anode of $A_1$ has therefore a potential of +80 volts, defined by the diode $D_{11}$, during the dash interval. The resistance chain connected to the anode of $A_1$ is such as to give the control grid of $A_2$ a tendency to be at earth potential under these conditions. It is, however, driven beyond cut off, during the early part of the dash period, by the dot waveform, negative-going from a resting level of +5 volts, applied via the diode $D_{13}$. The positive pulse at the anode of $A_2$ is therefore a dot and the cathode ray tube will be brightened for the dot period only, to produce the plain defocused beam and resultant recorded charge pattern significant of a "1." The dash waveform applied via $D_{12}$, ensures that $A_2$ is bottomed and the cathode ray tube blacked out for the interval before a dot (or dash) occurs.

The defocus-focus arrangement disclosed above operates best where uniform defocus over the tube face or screen is obtained. This is sometimes difficult to achieve.

It will be recalled that in order for the defocus-focus system to operate it was necessary to cause first, and without option, the illumination of a certain area greater than minimum spot size in order to "read" the charge state of this elemental area and according to the result of this "reading" a smaller area, contained within the larger one, was bombarded or not bombarded to "rewrite" the information.

Attention is now centred on the means for producing the first, outer, area of charge, the remainder of the equipment being unchanged.

Instead of producing this outer area by applying a waveform to the focusing electrode it is proposed to supply this electrode with steady potential corresponding with good focus and that suitable waveforms, preferably sinusoidal, be applied to the X and Y plates.

This arrangement results in a Lissajou figure which will depend upon the ratio of the frequencies of the applied waveforms. It is important that the area covered by the Lissajou figure, whatever its configuration, extend over and beyond the area corresponding with a sharply focused dot. The frequency of the waveforms used must be sufficiently high so that at least one complete cycle, and preferably more than one, of the waveform having the lower frequency of the ratio occurs during the period of the "reading" or first illumination. The higher the frequency used the more nearly the effect will approximate bombarding the whole area simultaneously as is done with a true "defocused" spot. In any case the rate of sweep of the spot which traverses or draws the Lissajou figure should be too high to allow steady state conditions to be set up at the bombarded point so that so long as the first interval continues the whole area covered by the figure moves to and remains at a positive potential, and can be "filled in" if desired by subsequent illumination, during a second interval, of an area within its outer boundary by a sharply focused dot in the absence of deflecting signals.

Suitable waveforms for a single storage element are shown in Fig. 18. The voltages which caused deflection to the next element are omitted.

Using an amplifier similar to that used in Fig. 15 for "defocus-focus," similar waveforms result and a gate circuit similar to 107 may be used.

The elemental area on the cathode ray tube screen will appear as shown in Fig. 19. As will be seen in the drawing this arrangement by which a rectangular elemental area is produced yields better "packing" into rectangular arrays on the screen. Also much of the area bounded by the elemental rectangle is bombarded and not just the ring surrounding the spot. It may be noted in Fig. 18 that the optional second interval is indicated as including the "decay" of the oscillations of X and Y deflections. This is not necessary, but is advantageous as the Lissajou rectangle collapses slowly into a single spot and refilling is more efficient.

It is emphasised that the storage arrangements specifically discussed above are given by way of example only, and the invention is not limited in its scope to these storage arrangements only. It will be apparent that the way in which the invention will be applied in a particular case will depend on the nature of the information to be stored, the desired order of reading, the required reading speed, and other considerations. Furthermore, it must be understood that the invention is not limited to the storage of signals in digital computers and like machines. The following claims are intended to set forth the invention in terms which include the spirit thereof and are sufficiently generic to cover the many possible physical embodiments thereof.

We claim:

1. An electrical information storing means for storing electrical signals comprising a cathode ray tube having a charge-retaining screen and beam projecting means for producing an electron beam at a velocity such that upon striking said screen the number of secondary electrons liberated is greater than the number of primary electrons arriving in the beam, voltage pick-up means capacitively coupled to said screen, a sweep circuit means directing said beam at recurrent instants toward a discrete elemental area of said screen to produce a first charge condition on said elemental area, beam control means causing said beam to bombard a further area of said screen from which secondary electrons can pass to said elemental area to modify the said first charge condition, and means including said pick-up means responsive to said signals to render said beam control means operative or inoperative according to the nature of said signals, said beam control means comprising means to vary the degree of focus of said beam.

2. An electrical information storing means comprising a cathode ray tube having a charge-retaining recording screen and beam projecting means for producing an electron beam at a velocity such that upon striking said screen the number of secondary electrons liberated is greater than the number of primary electrons arriving in the beam, a signal voltage pick-up element electrostatically coupled to said screen, a sweep circuit means for causing the beam to irradiate repetitively a discrete elemental area of said screen, modulating means disposed to control the intensity of said beam, signal input means to which an information signal to be stored is applied; a gate circuit having an input terminal, an output terminal and a control terminal to which are applied voltages to open said gate circuit to provide a coupling between said input and output terminals; means operatively connecting said voltage pick-up element to said gate circuit; a first pulse generator generating a first train of pulses, a second generator generating a second train of pulses, each pulse of said second train ending after a pulse of said first train, means coupling said first pulse generator to said modulating means, means coupling said second pulse generator to said input terminal, means coupling said output terminal with said modulating means, means coupling said signal input means to said control terminal, beam focus control means, and means synchronising said focus control means with said pulse generators whereby the beam is relatively poorly focused during each pulse of said first train and relatively sharply focused throughout at least a part of the duration of each pulse of said second train.

3. An electrical information storing means for storing electrical signals comprising a cathode ray tube having a recording screen and beam projecting means for producing an electron beam at a velocity such that upon striking said screen the number of secondary electrons liberated is greater than the number of primary electrons arriving in the beam, pick-up means capacitively coupled to said screen, a sweep circuit means for causing said beam to irradiate at recurring instants a discrete elemental area of said screen to generate a first charge condition on said elemental area, beam control means including a gate circuit, a beam control voltage source and a beam control electrode of said cathode ray tube, said beam control electrode in response to said beam control voltage applied thereto causing said beam to bombard a further area of said screen from which secondary electrons can pass to said elemental area to modify the said first charge condition, said gate circuit having input and output terminals and a control terminal and being responsive to a voltage of predetermined character at said control terminal to open said gate circuit and thereby couple said input and output terminals, means coupling said beam control electrode to said output terminal, means coupling said input terminal to said beam control voltage source and means coupling said control terminal to said pick-up means, said beam-controlling means comprising elements to vary the degree of focus of said beam.

4. An electrical information storing means for storing electrical signals comprising a cathode ray tube having a recording screen and beam projecting means for producing an electron beam at a velocity such that upon striking said screen the number of secondary electrons liberated is greater than the number of primary electrons arriving in the beam, pick-up means capacitively coupled to said screen, a sweep circuit means for causing said beam to irradiate at recurring instants a discrete elemental area of said screen to generate a first charge condition on said elemental area, beam control means including a gate circuit, a beam control voltage source and a beam control electrode of said cathode ray tube, said beam control electrode in response to said beam control voltage applied thereto causing said beam to bombard a further area of said screen from which secondary electrons can pass to said elemental area to modify the said first charge condition, said gate circuit having input and output terminals and a control terminal and being responsive to a voltage of predetermined character at said control terminal to open said gate circuit and thereby couple said input and output terminals, means coupling said beam control electrode to said output terminal, means coupling said input terminal to said beam control voltage source, means coupling said control terminal to said pick-up means, and focus control means maintaining said beam poorly focused during said recurring instants and sharply focused after such instants, said beam control electrode being a beam intensity control electrode and said beam control voltage holding said beam switched on after said recurring instants.

5. A method of storing digital information as a charge pattern on a charge-retaining surface in a cathode ray tube by representing different digit values by different states of electrostatic charge respectively, which comprises recording one digit on a discrete area of said surface by directing the electron beam of said tube upon said area to release secondary electrons from said area and thereby impart a predetermined charge condition to the area and subsequently directing the electron beam upon an element of said surface within the outer boundaries of and other than co-extensive with said discrete area, thereby modifying the charge condition on at least a part of said discrete area.

6. A method according to claim 5 wherein the said first direction of the electron beam upon said area is effected while the said beam is held in a defocused condition and said subsequent direction of electrons upon said element is effected while the said beam is held in a sharply focused condition.

7. A method of storing digital information as a charge pattern on a charge-retaining surface using a beam of electrons, wherein different digit values are represented by different states of electrostatic charge respectively, which comprises recording one digit on a discrete area of said surface by first defocusing said beam and bombarding said area therewith, and subsequently focusing said beam more sharply and bombarding therewith an element of said surface within the outer boundaries of and other than co-extensive with said discrete area.

8. An electrical information storing means for storing electrical signals comprising a cathode ray tube having a charge-retaining screen and beam projecting means for producing an electron beam at a velocity such that upon striking said screen the number of secondary electrons liberated is greater than the number of primary electrons arriving in the beam, voltage pick-up means capacitively coupled to said screen, a sweep circuit means directing said beam recurrently toward selected regions of said screen, beam area control means controlling the area of each of said regions bombarded by said beam between a first area and a second area located within the outer boundaries of, but not co-extensive with, the first area, selecting means connected to said beam area control means and controlling the operation of said beam area control means between two conditions, in one of which said beam bombards only said first area and in the other of which said beam bombards said first area and subsequently said second area, and means applying said signals representative of the information to be stored to said selecting means to select the appropriate one of said conditions according to the information to be stored.

9. An electrical information storing means according to claim 8, wherein said beam area control means comprise beam focus control means controlling the degree of focus of said beam.

References Cited in the file of this patent

UNITED STATES PATENTS

| | | |
|---|---|---|
| 2,093,157 | Nakashima et al. | Sept. 14, 1937 |
| 2,423,304 | Fitch | July 1, 1947 |
| 2,436,827 | Richardson et al. | Mar. 2, 1948 |
| 2,438,709 | Labin et al. | Mar. 30, 1948 |
| 2,671,607 | Williams | Mar. 9, 1954 |